(12) United States Patent
Zong et al.

(10) Patent No.: US 8,559,200 B2
(45) Date of Patent: Oct. 15, 2013

(54) METHOD AND APPARATUS OF LOW CURRENT STARTUP CIRCUIT FOR SWITCHING MODE POWER SUPPLIES

(75) Inventors: Qiang Zong, Shanghai (CN); Shaohua Fang, Shanghai (CN); Reixia Fei, Shanghai (CN); Jia Xie, Shanghai (CN)

(73) Assignee: BCD Semiconductor Manufacturing Limited, Grand Cayman (KY)

( * ) Notice: Subject to any disclaimer, the term of this patent is extended or adjusted under 35 U.S.C. 154(b) by 188 days.

(21) Appl. No.: 13/015,493

(22) Filed: Jan. 27, 2011

(65) Prior Publication Data

US 2011/0116289 A1    May 19, 2011

Related U.S. Application Data

(63) Continuation of application No. 12/466,313, filed on May 14, 2009, now Pat. No. 7,894,219.

(30) Foreign Application Priority Data

Mar. 27, 2009   (CN) .......................... 2009 1 0131728

(51) Int. Cl.
 *H02M 1/00*  (2007.01)
 *H02M 3/335* (2006.01)
(52) U.S. Cl.
 USPC .......................................... 363/49; 363/21.16
(58) Field of Classification Search
 USPC ..................... 363/49, 21.16, 21.12
 See application file for complete search history.

(56) References Cited

U.S. PATENT DOCUMENTS

| | | | |
|---|---|---|---|
| 4,130,862 A * | 12/1978 | Holt | 363/49 |
| 6,757,183 B2 | 6/2004 | Feldtkeller | |
| 7,894,219 B2 | 2/2011 | Zong et al. | |
| 8,169,803 B2 * | 5/2012 | Huang et al. | 363/49 |
| 8,456,872 B2 * | 6/2013 | Lu | 363/21.16 |

OTHER PUBLICATIONS

Notice of Allowance for U.S. Appl. No. 12/466,313, mailed on Oct. 28, 2010, 8 pages.

* cited by examiner

*Primary Examiner* — Matthew Nguyen
(74) *Attorney, Agent, or Firm* — Kilpatrick Townsend and Stockton LLP

(57) ABSTRACT

A startup circuit for a switching-mode power supply (SMPS) includes a first voltage detector configured to trigger the switching-mode power supply from a first operation mode to a second operation mode when an input supply voltage exceeds a first threshold voltage, a current consumption in the first voltage detector in the first operation mode being determined by a reverse leakage current of a diode. A feedback circuit is coupled to the first voltage detector and being capable of maintaining a positive feedback loop. A second voltage detector is coupled to the first voltage detector and the feedback circuit, and is configured to trigger the switching-mode power supply to switch from the second operation mode to the first operation mode when the input supply voltage is below a second threshold voltage.

21 Claims, 6 Drawing Sheets

METHOD AND APPARATUS OF LOW CURRENT STARTUP CIRCUIT FOR SWITCHING MODE POWER SUPPLIES

CROSS-REFERENCES TO RELATED APPLICATIONS

This application is a continuation of U.S. patent application Ser. No. 12/466,313, filed May 14, 2009, which claims the benefit and priority of Chinese Application No. 200910131728.7, filed Mar. 27, 2009, both of which are commonly assigned and hereby incorporated by reference in its entirety for all purposes.

BACKGROUND OF THE INVENTION

The present invention relates to switching-mode power supplies (SMPS), and more particularly to a startup circuit that is configured to produce a low startup current for switching-mode power supplies.

Regulated power supplies are indispensable in modern electronics. For example, desktop and laptop computers often receive unregulated power input from various outlets and provide regulated power supplies on the motherboard to the CPU, memories, and periphery circuitry. Regulated power supplies may be used in a wide variety of consumer applications, such as home appliances, automobiles, and portable chargers for mobile electronic devices, etc.

A switching-mode power supply (SMPS) is an electronic power supply unit that may be regulated using a switching-mode controller. In general, a switching-mode controller rapidly switches a power transistor between on and off states with a variable duty cycle (pulse width modulation, or PWM) or variable frequency (pulse frequency modulation, or PFM), whose average is the desired output voltage. In a PWM controlled power supply, the duty cycle of the control pulse may be used to control the output of the power supply, whereas for a PFM controlled switching-mode power supply, the switching frequency may be controlled in response to load conditions.

SMPSs may have many advantages such as smaller size, higher efficiency, and larger output power capability, and are widely utilized in mobile phone chargers, notebook computer adapters, and other fields. In recent years, with the advent of green technology, companies are motivated to develop green power supplies with improved energy efficiency and low standby power consumption.

FIG. 1A is a simplified schematic diagram of a switching-mode power supply (SMPS) system 100 having a switching-mode controller 120 that includes a conventional startup circuit 130, which is described in more detail below in connection with FIG. 1B. SMPS system 100 also includes a full-wave bridge rectifier 106, a capacitor 104, and a transformer with a primary winding 103, a secondary winding 114, and an auxiliary winding 115. Rectifier 106 and capacitor 104 convert AC input Vac to a rectified DC line voltage $V_{IN}$. SMPS 100 also has a power transistor 107 coupled to controller 120 for controlling the on/off of current flow in primary winding 103, and a resistor 108 for sensing the current. Resistors 109 and 110 are connected to auxiliary winding 115 for providing a feedback signal FB to controller 120. SMPS 100 also has a resistor 116, a capacitor 101, and a diode 105 for providing a power supply to the Vcc terminal of controller 120.

Controller 120 has a startup threshold voltage Vst, which is used to determine whether the system is in a startup mode or a normal operation mode. When the system is in the startup mode, Vcc is below Vst, and controller 120 does not provide switching signals to power transistor 107. As a result, no energy is delivered from auxiliary winding 115. As depicted in FIG. 1, during the startup mode of system 100, capacitor 101 (also referred to as Cst) is charged by rectified line voltage $V_{IN}$ through startup resistor 116 (also referred to as Rst). The startup time (also referred to as Tst) for system 100 may be calculated using the following equation:

$$Tst=(Cst \times Vst)/(Is-I2); \text{ with } Is=(V_{IN}-Vcc)/Rst,$$

where Vst is the startup voltage or threshold voltage for system 100 and I2 is the startup current for controller 120. According to the above equation, for any given values of line voltage $V_{IN}$ and startup resistor 116, the startup time for system 100 may be reduced by reducing the startup current (I2) for controller 120.

When Vcc reaches Vst, the system enters the normal operation mode. During the normal operation mode of system 100, the OUT pin of controller 120 may provide one or more switching signals to turn power transistor 107 on and off to regulate the output voltage of secondary winding 114. Since controller 120 may draw more current during the normal operation mode of system 100 than during the startup mode, capacitor 101 may receive energy from auxiliary winding 115 to supply the operating current to controller 120 during the normal operation of system 100.

FIG. 1B is a simplified schematic diagram of conventional startup circuit 130 for a switching-mode power supply such as system 100 of FIG. 1. As depicted in FIG. 1B, an internal bandgap reference circuit 132 produces a reference voltage Vbg, and a regulation circuit 135 produces an internal power supply voltage Vdd. Here, supply voltage Vcc is sampled using a resistor divider circuit including resistors 141, 142, and 143. The sampled value of Vcc is compared with Vbg at a comparator 144. The voltage value for threshold voltage Vst may be determined based on the voltage drop across resistors 142 and 143 and reference voltage Vbg. When the voltage drop across resistors 142 and 143 exceeds the voltage value for Vbg, comparator 144 outputs an Enable signal, indicating that the switching-mode power supply controller has entered the normal operation mode. Conversely, when the sampled valued of Vcc drops below Vbg, the system goes in the startup mode. Additionally, a switch 146 in FIG. 1B may be used for functions related to hysteresis.

As depicted in FIG. 1A, the current flowing through resistor 116 includes the charging current for capacitor 101 (I1) and the startup current for controller 120 (I2). A small value for resistor 116 may generate a large current, which in turn shortens the startup time. However, a large current consumes more energy, thereby increasing system standby power. On the other hand, the value for capacitor 101 may not be reduced due to the controller normal operation current restriction.

From the above, it is seen that even though switching mode power supplies (SMPS) are widely used, they suffer from many limitations. Therefore, improved techniques for reducing the startup current (thereby reducing the standby power) while shortening the startup time for switching mode power supplies is needed.

BRIEF SUMMARY OF THE INVENTION

The present invention relates to techniques for reducing standby power in a switching-mode power supply (SMPS). More particularly, embodiments of the present invention provide a startup circuit in an SMPS controller that is configured to require a low startup current. In one embodiment, a reverse-biased diode is used to limit the current consumption of the controller in the startup mode. A low-current feedback circuit is configured to trigger the transition from the startup mode to the normal operation mode when a supply voltage reaches a reference voltage. The feedback circuit is capable of maintaining a positive feedback loop and the normal operation mode can be sustained by the feedback circuit with a low standby current. The startup circuit according to embodiments of the present invention reduces the startup current, thereby reducing the standby power of the SMPS. In an embodiment, the reduced startup current allows the use of a larger startup resistor in the power supply to reduce power consumption without loss of the startup time.

According to an embodiment of the present invention, a startup circuit for a switching-mode power supply includes a first voltage detector, a second voltage detector, and a feedback circuit. The first voltage detector is configured to trigger the switching-mode power supply from a startup mode to a normal operation mode when an input supply voltage exceeds a first threshold voltage. The feedback circuit is coupled to the first voltage detector and configured to maintain or lock the switching-mode power supply in the normal operation mode. In an embodiment, the feedback circuit is capable of maintaining a positive feedback loop with a current consumption of no more than a microampere. The second voltage detector is coupled to the first voltage detector and the feedback circuit and configured to trigger the switching-mode power supply to switch from the normal operation mode to the startup mode when the input voltage is below a second threshold voltage.

In an embodiment of the above startup circuit, the first voltage detector includes a diode and a resistor coupled in series, and the first threshold voltage is based upon a reverse breakdown voltage of the diode.

In another embodiment, the first voltage detector includes a first diode and a resistor coupled in series, and at least one second diode is coupled to the first diode for compensating the reverse breakdown voltage temperature characteristic of the first diode.

In another embodiment, the feedback circuit includes first transistor and second transistor cross-coupled to each other, a diode coupled between the first and the second transistors and configured to determine a current direction during establishing a positive feedback loop, and a voltage source coupled to the diode for providing a bias voltage.

In another embodiment, a first resistor coupled to the gate of the first transistor and a second resistor coupled to the gate of the second transistor are configured to limit a current in the startup circuit to no more than one microampere. In another embodiment, the voltage source includes one or more series-connected diodes.

In one embodiment, the second voltage detector includes a PMOS transistor, a voltage divider coupled to the PMOS transistor, a reference voltage generator coupled to the PMOS transistor and the voltage divider for generating a reference voltage, a comparator coupled to the reference voltage generator, and an NMOS transistor coupled to the comparator. The second voltage detector further includes a delay circuit coupled to the PMOS transistor.

In another embodiment, the present invention provides a switching-mode controller that includes a startup circuit as described above. In an embodiment, the startup circuit has a current consumption of no more than one microampere. The startup circuit is configured to reduce a startup current of the controller. In an embodiment, the controller also includes first input terminal for receiving a feedback voltage signal, second input terminal for receiving a feedback current signal, an output terminal for outputting a control signal, a power supply terminal for receiving a supply voltage. In an embodiment, the startup circuit is coupled to the power supply terminal.

In yet another embodiment, the present invention provides a switching-mode power supply including a switching-mode controller that has a startup circuit as described above. In an embodiment, the startup circuit has a current consumption of no more than one microampere. In an embodiment, the switching-mode power supply also includes a startup resistor for coupling to a DC input voltage source for providing a startup current to the controller and a capacitor coupled to the resistor for providing a power supply to the controller. In embodiments of the invention, a large resistor can be used as the startup resistor to reduce the standby current. For example, the resistance of the startup resistor can be 10 MΩ or larger.

In another embodiment, a startup circuit for a switching-mode power supply (SMPS), includes a first voltage detector configured to trigger the switching-mode power supply from a first operation mode to a second operation mode when an input supply voltage exceeds a first threshold voltage, which is based upon a reverse breakdown voltage of a diode. A current consumption in the first voltage detector in the first operation mode is determined by a reverse leakage current of a diode. The startup circuit also includes a feedback circuit coupled to the first voltage detector and being capable of maintaining a positive feedback loop. The startup circuit further includes a second voltage detector coupled to the first voltage detector and the feedback circuit, and configured to trigger the switching-mode power supply to switch from the second operation mode to the first operation mode when the input supply voltage is below a second threshold voltage.

In another embodiment, an electronic circuit includes an input terminal for receiving a feedback signal, an output terminal for outputting an output signal, and a power supply terminal for receiving a supply voltage. The controller also includes a first circuit coupled to the power supply terminal and configured to trigger the controller from a first operation mode to a second operation mode when the supply voltage exceeds a first threshold voltage. The controller also includes a feedback circuit coupled to the first voltage detector and being capable of maintaining a positive feedback loop. The controller further includes a second circuit coupled to the first circuit and the feedback circuit. The second circuit is configured to trigger the controller to switch from the second operation mode to the first operation mode when the supply voltage is below a second threshold voltage. In a specific embodiment, the first circuit, the second circuit, and the feedback circuit are configured to consume no more than one microampere of current.

In yet another embodiment, a switching-mode power supply (SMPS) includes a controller for controlling the switching mode power supply. A startup circuit for the controller includes a first voltage detector configured to trigger the switching-mode power supply from a first operation mode to a second operation mode when an input supply voltage exceeds a first threshold voltage. A current consumption in the first voltage detector in the first operation mode is determined by a reverse leakage current of a diode. The startup circuit also includes a feedback circuit coupled to the first voltage detector and being capable of maintaining a positive feedback loop. The startup circuit further includes a second voltage detector coupled to the first voltage detector and the feedback circuit. The second voltage detector is configured to trigger the switching-mode power supply to switch from the second operation mode to the first operation mode when the input supply voltage is below a second threshold voltage.

The foregoing, together with other features and embodiments will become more apparent when referring to the following specification, claims, and accompanying drawings.

DETAILED DESCRIPTION OF THE INVENTION

Figure 1A:
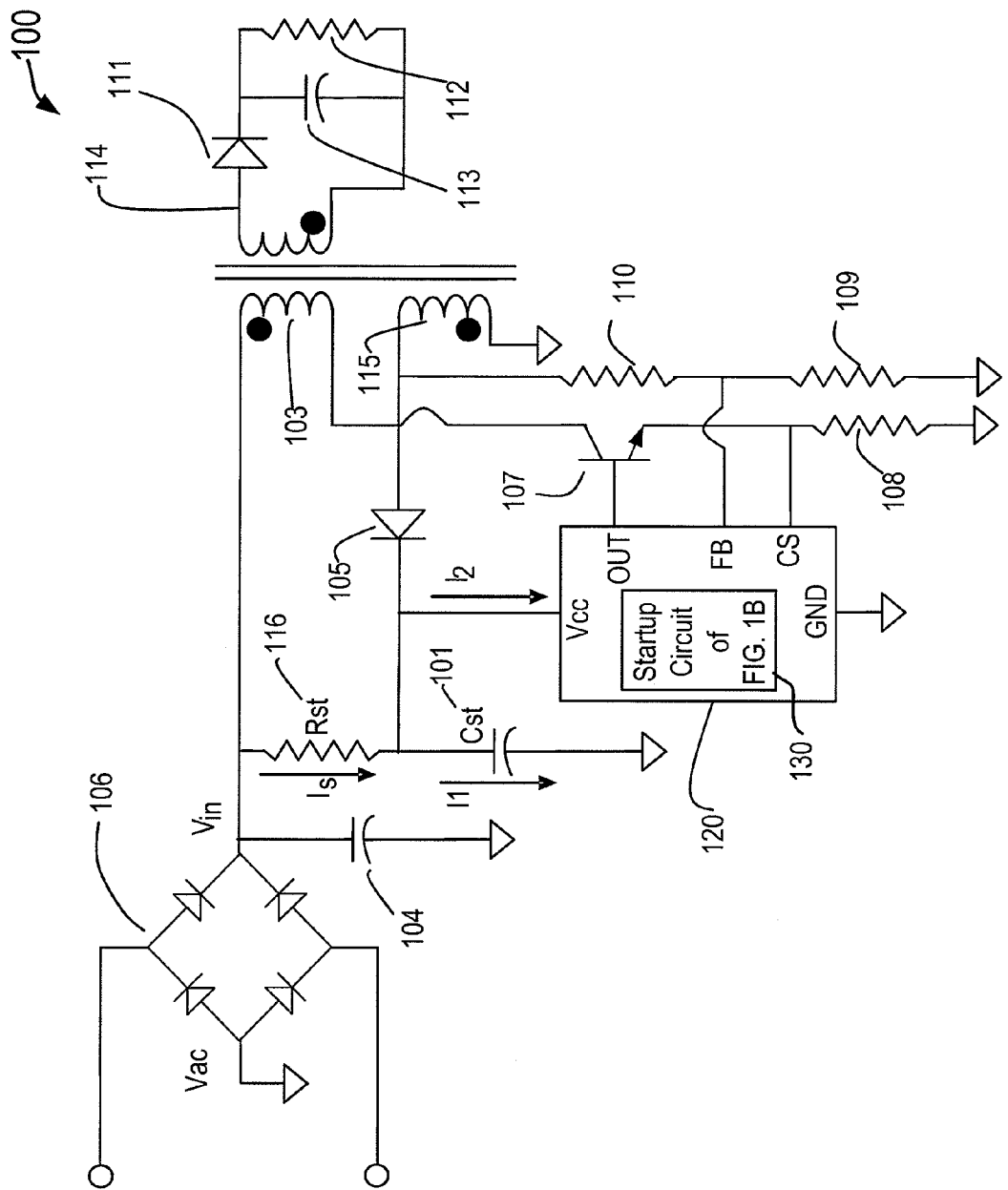
FIG. 1A is a simplified schematic diagram of a switching-mode power supply having a controller that includes a conventional startup circuit.
Figure 1B:
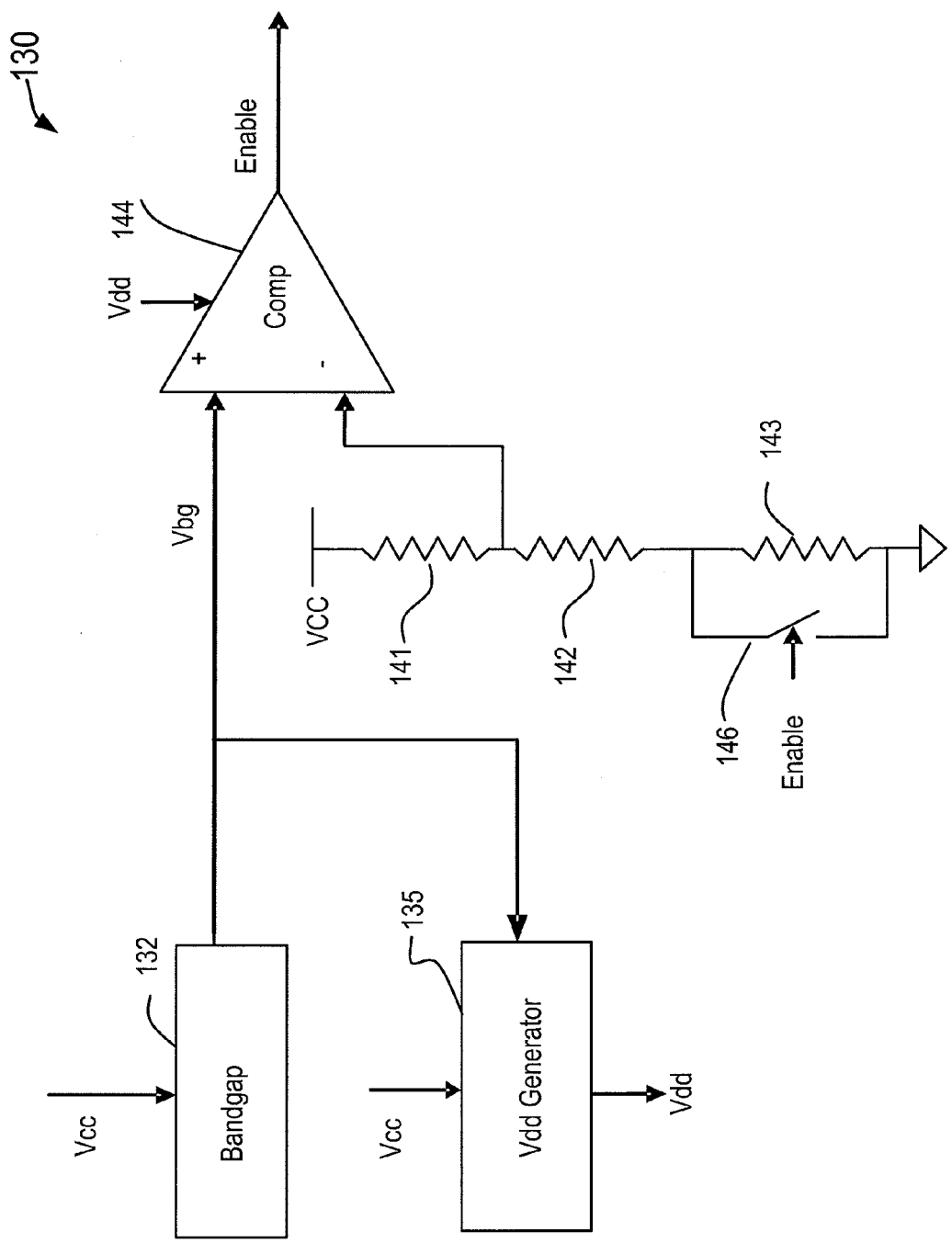
FIG. 1B is a simplified schematic diagram of a conventional startup circuit for a switching-mode power supply.
Figure 2:
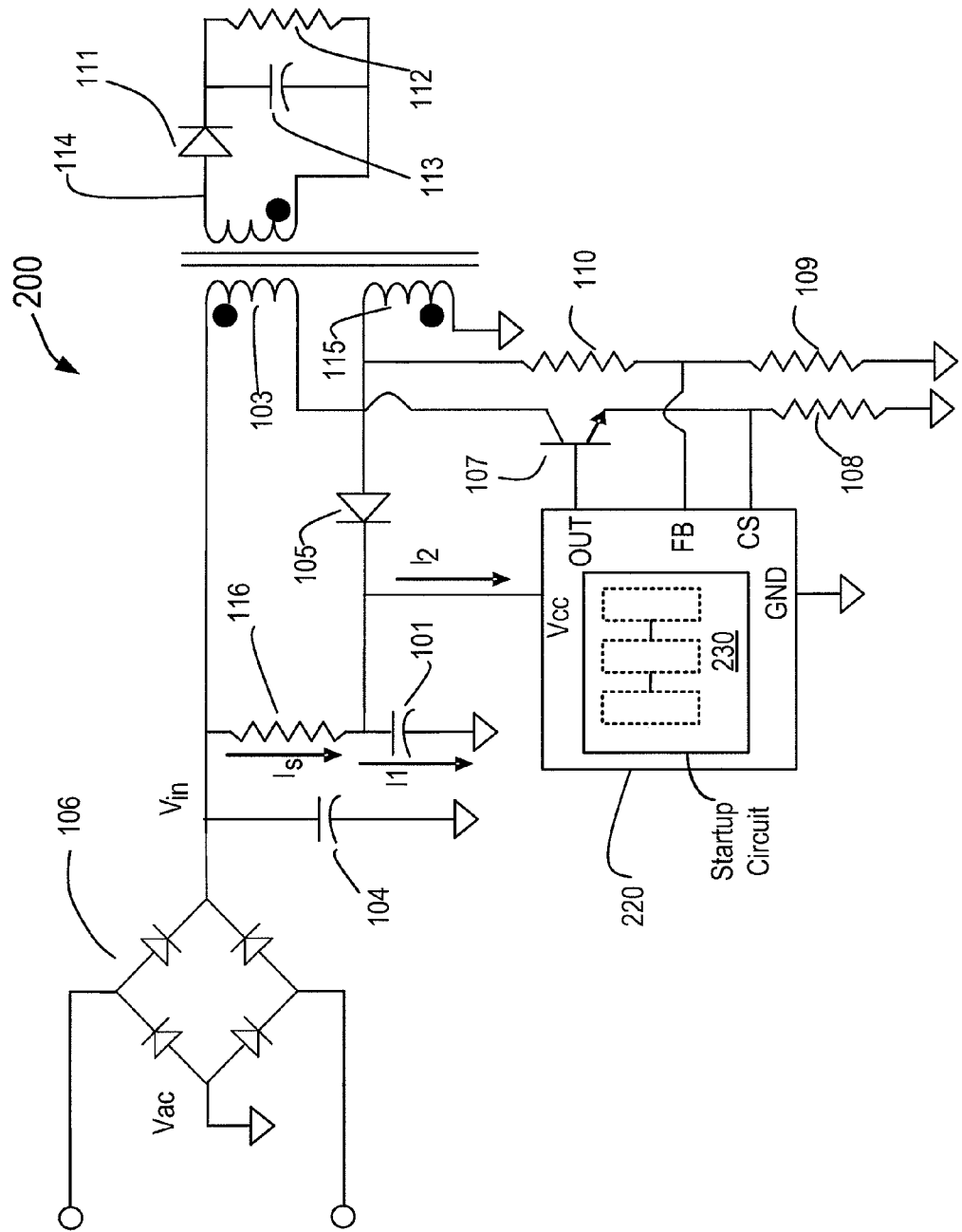
FIG. 2 is a simplified schematic diagram of a switching-mode power supply (SMPS) system having a switching-mode controller that includes a startup circuit according to an embodiment of the present invention.

FIG. 2 is a simplified schematic diagram of a switching-mode power supply (SMPS) system 200 having a switching-mode controller 220 that includes a startup circuit 230 according to an embodiment of the present invention. As shown, power supply 200 is similar to SMPS 100 of FIG. 1, with the exception of controller 220, which is described below. Components in FIG. 2 similar to those in FIG. 1 are labeled with identical reference numerals, and their functions are similar to those of their counterparts described in connection with FIGS. 1A and 1B.

In FIG. 2, an external DC input supply voltage is provided by AC power source Vac, bridge rectifier 106, and capacitor 104. Resistor 116 and capacitor 101 are used to provide a startup power (by current Is) to controller 220. As described above in connection with SMPS 100 of FIG. 1A, if controller 220 can operate with a low current consumption, resistor 116 can be made large, and the standby power of the SMPS can be reduced. In addition, controller 220 can be a pulse width modulated (PWM) controller or a pulse frequency modulated (PFM) controller, or other types of controller as required by the application.

As shown in FIG. 2, SMPS controller 220 has a first input terminal FB for receiving a feedback voltage signal, a second input terminal CS for receiving a feedback current signal, an output terminal OUT for outputting a control signal, and a power supply terminal Vcc for receiving a supply voltage. According to embodiments of the invention, controller 220 also has a startup circuit 230 that is configured to consume a low current I2 in the startup mode and to enable a transition from the startup mode to the normal operation mode under a low-current condition. For example, in some embodiments, startup circuit 230 can perform these functions with a current consumption of no more than one microampere as described below. In this arrangement, most of current Is can be used to charge up the startup capacitor 101 (i.e., as current I1 in FIG. 2). As a result, the standby current of SMPS 200 can be reduced. A low Is can be achieved, for example, by using a large resistor 116. Merely as an example, in an embodiment, the resistance of resistor 116 can be about 40 MΩ. With such a high resistance, the standby power of SMPS 200 can be reduced to about 10 mWatts. In other embodiments, resistor 116 may have a resistance of about 10 MΩ or higher. In contrast, a conventional startup circuit such as shown in FIGS. 1A and 1B often requires substantially more current. As a result, resistor 116 may be limited to relatively small values such as 100 KΩ, resulting in substantially higher standby current.

Figure 3:
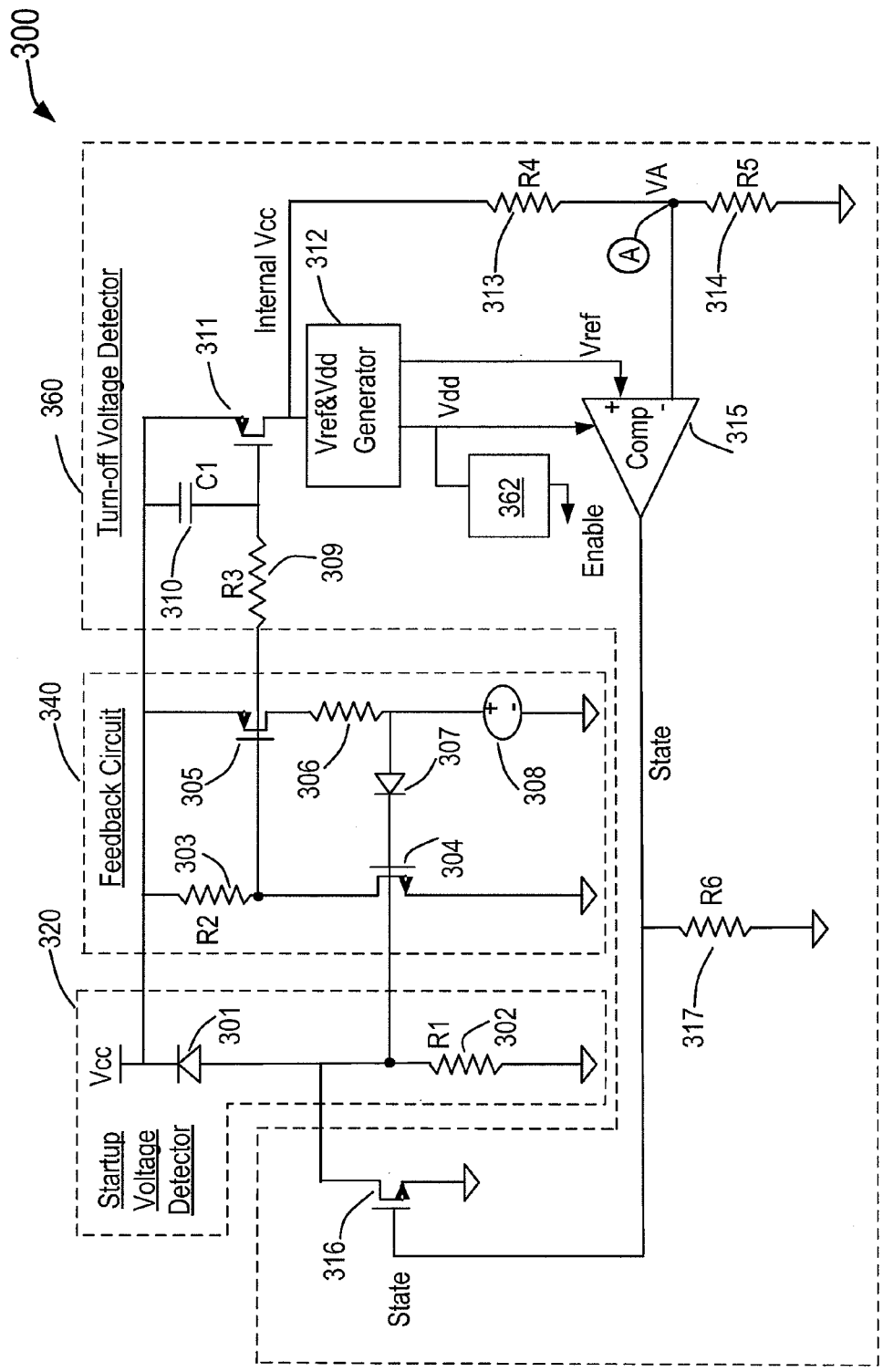
FIG. 3 is a simplified schematic diagram of a sub-microampere startup circuit for a switching-mode power supply according to an embodiment of the present invention.

FIG. 3 is a simplified schematic diagram of a startup circuit 300 for a switching-mode power supply according to an embodiment of the present invention. In one embodiment, startup circuit 300 may be configured to produce a sub-microampere startup current for switching-mode power supply controllers such as switching-power supply controller 220 depicted in FIG. 2. In some embodiments, a startup circuit such as 300 can be incorporated in a switch-mode controller integrated circuit. In other embodiments, the startup circuit can be implemented in a separate integrated circuit or discrete components. The various components depicted in FIG. 3 are merely examples of components that may be included in startup circuit 300. In alternate embodiments, startup circuit 300 may have fewer or more components than those shown in FIG. 3.

As depicted in FIG. 3, startup circuit 300 includes a startup voltage detector 320, a feedback circuit 340, and a turn-off voltage detector (or low-voltage detector) 360. In one embodiment, startup voltage detector 320 includes a diode 301 and a resistor 302, and may include other components. Feedback circuit 340 includes a resistor 303, an NMOS transistor 304, a PMOS transistor 305, a second resistor 306, a diode 307, a voltage source 308, and may include other components. Turn-off voltage detector 360 includes a delay circuit including a resistor 309 and a capacitor 310, a PMOS transistor 311, a voltage divider including resistors 313 and 314, a pull-down resistor 317, a Vref&Vdd generator 312, a comparator 315, and an NMOS transistor 316. As shown in FIG. 3, in some embodiments, turn-of voltage detector also includes a logic circuit 362 and may include other components. As discussed above, the various components depicted in startup circuit 300 are merely examples of components that may be included in startup circuit 300. Of course, there can be other variations, modifications, and alternatives.

In FIG. 3, Vcc refers to the power supply input terminal of switch-mode controller 220 in FIG. 2. During startup, Vcc rises as Vcc capacitor 101 is charged up by line voltage $V_{IN}$. When Vcc is less than the reverse breakdown voltage Vb of diode 301, there is no current flowing through diode 301, and the voltage drop across resistor 302 is almost zero other than the reverse leakage current of diode 301. In this case, NMOS transistor 304 and PMOS transistor 305 are both in the cut-off region. As a result, there is no current flowing through the various internal circuits of startup circuit 300. The current consumption for startup circuit 300 during this startup stage (when Vcc<Vb) is substantially the reverse leakage current for diode 301, which in some embodiments can be less than one microampere.

When Vcc exceeds the diode reverse breakdown voltage Vb, a current begins to flow through resistor 302. As the voltage across resistor 302 rises and exceeds the threshold voltage Vthn for NMOS transistor 304, feedback circuit 340 starts to establish a positive feedback loop. At some point, both NMOS transistor 304 and PMOS transistor 305 enter the triode region. As a result, the various internal circuits of startup circuit 300 start to function and the internal reference voltages Vref and Vdd are then established by circuit block 312. Subsequently, a logic circuit 362 generates an Enable signal indicating that the power supply has entered the normal operation mode, and the operating power for the controller can now be provided by auxiliary winding 115.

For the positive feedback loop in circuits 340 and 320 to be established, a certain amount of current is needed. This is also referred to as the startup current. As shown in FIG. 3, the startup current includes the current consumed by diode 301 and resistor 302 and the current consumed by resistor 303 and transistor 304. In one embodiment, the amount of startup current needed to trigger the positive feedback loop may be given by the following equation:

$$I = Vthn/R1 + Vthp/R2$$

where Vthn is the threshold voltage for NMOS 304 and Vthp is the threshold voltage for PMOS 305. In the above equation, Vthn/R1 is the current across resistor R1 needed to turn on NMOS transistor 304, and Vthp/R2 is the current across resistor R2 needed to turn on PMOS transistor 305. When both transistors 304 and 305 are turned on, the feedback loop is established. Current I as defined above is also the current required to maintain the feedback loop. According to the above equation, current I may be reduced by increasing the resistance values for R1 and R2. In one embodiment, this startup current can be reduced to less than one microampere. For example, in an embodiment in which Vthn and Vthp are approximately 1V, R1 and R2 may have resistances on the order of 5 MΩ. In this case, the trigger current I is approximately 0.4 microamperes.

Thus, SMPS 200 of FIG. 2 can have a low standby current Is which, besides charging up Vcc capacitor 101, provides enough startup current to establish the positive feedback loop to set the power supply in the normal operation mode. As mentioned above, in some embodiments, feedback circuit 340 also includes diode 307 and voltage source 308. Diode 307 functions to regulate current flow in the feedback loop. Voltage source 308 is configured provide a bias voltage to further turn on NMOS transistor 304 after the feedback loop enables a small amount of current to flow through PMOS transistor 305, resistor 306, and diode 307. In a specific embodiment, the voltage at voltage source 308 is approximately 4-5V.

In FIG. 3, the startup voltage (Vst) for startup circuit 300 may be determined using the following equation:

$$Vst = Vb + Vthn$$

where Vb is the reverse breakdown voltage of diode 301 and Vthn is the threshold voltage of NMOS transistor 304. As an example, Vb may be approximately 15-16V and the magnitude of Vthn may be approximately 1V. In some embodiment, a Zener diode may also be used.

After startup circuit 300 enters into the normal operation mode, the voltage value for "internal Vcc" at the drain terminal of PMOS transistor 311 as shown in FIG. 3 is approximately equal to the voltage value of input supply voltage Vcc. Supply voltage Vcc can be monitored by voltage VA at node A between resistors 313 (R4) and 314 (R5) and may be determined by the following formula:

$$VA = Vcc*R5/(R4+R5)$$

According to this formula, a drop in Vcc would cause a corresponding drop in VA. In some embodiments, once the positive feedback loop is set up by positive feedback circuit 340, the switching-mode power controller can stay in the normal operation mode even if Vcc is lower than Vst, as long as Vcc does not fall below a certain threshold voltage. When Vcc is below Vst, the feedback loop can be maintained with a low current consumption. If Vcc continues to drop, the controller may enter the startup mode. However, when VA is lower than the internal reference voltage Vref due to a voltage drop for Vcc, comparator 315 outputs a State signal that causes NMOS transistor 316 to turn on and NMOS transistor 304 to turn off. As a result, the positive feedback loop is broken, and transistors 304 and 305 re-enter the cut off region and the switching-mode power controller switches from the normal operation mode to the startup mode. A turn-off reference voltage Voff can be defined such that when Vcc drops below Voff, the system switches from the normal operation mode to the startup mode. In the embodiment of FIG. 3, Voff can be determined by the following formula:

$$Voff = Vref*(R4+R5)/R5$$

In one embodiment, turn-off voltage detector 360 also has a delay circuit that includes resistor 309 and capacitor 310. The function of the delay circuit is to allow time for the positive feedback loop to be established before the various internal circuits of startup circuit 300 begins to work. In one embodiment, resistor 317 is used in startup circuit 300 to set the State signal at low before supply voltage Vcc reaches startup voltage Vst.

Figure 4:
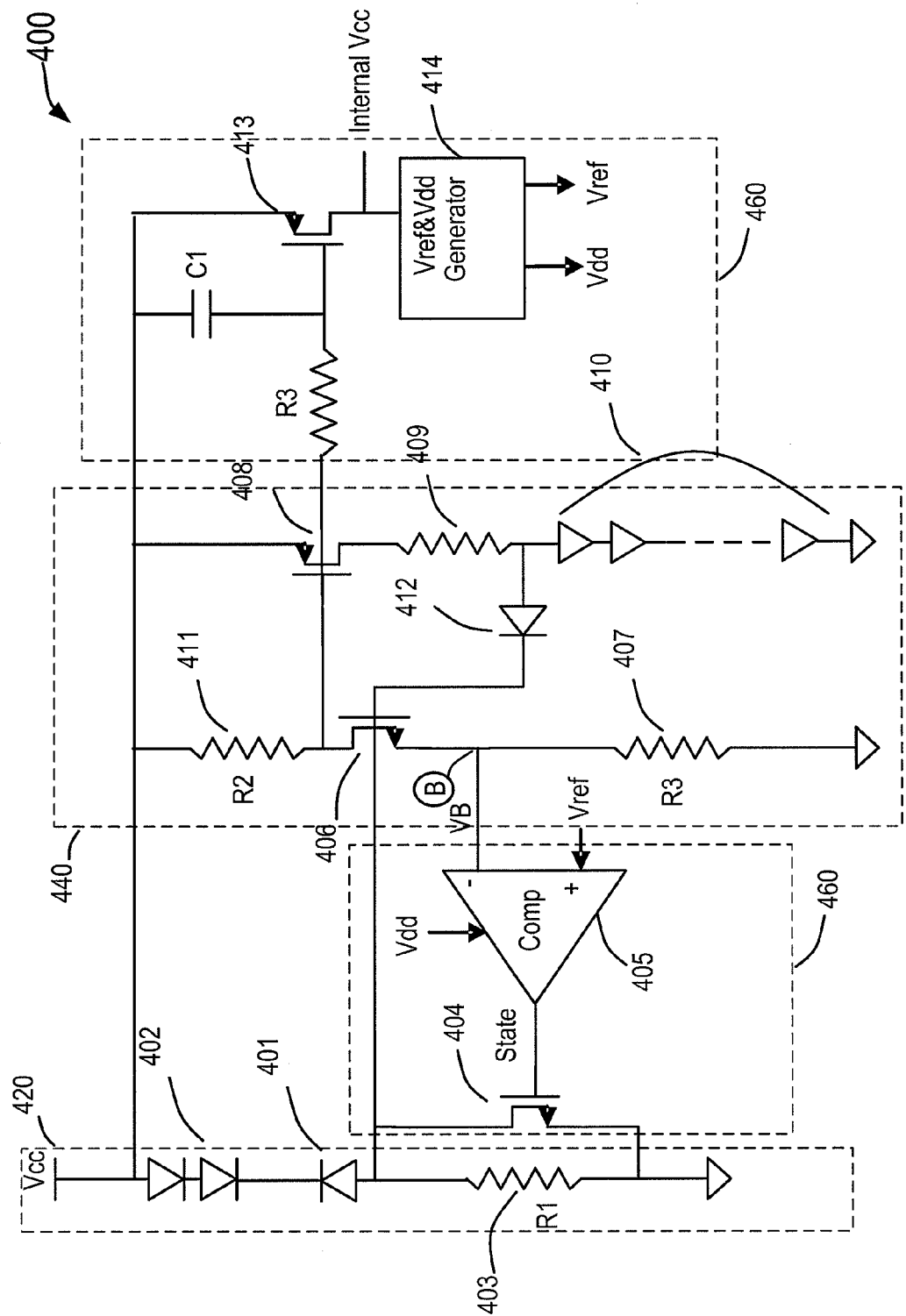
FIG. 4 is a simplified schematic diagram of a sub-microampere startup circuit for a switching-mode power supply according to another embodiment of the present invention.

FIG. 4 is a simplified schematic diagram of a startup circuit 400 for a switching-mode power supply according to another embodiment of the present invention. In one embodiment, startup circuit 400 may be used as startup circuit 230 in SMPS 200 depicted in FIG. 2. The various components depicted in FIG. 4 are merely examples of components that may be included in startup circuit 400. In alternate embodiments, startup circuit 400 may have fewer or more components than those shown in FIG. 4.

As depicted in FIG. 4, startup circuit 400 is similar to startup circuit of FIG. 3, with a startup voltage detector 420, a feedback circuit 440, and a turn-off voltage detector (or low-voltage detector) 460 performing similar functions as their counterparts 320, 340, and 360 in startup circuit 300 of FIG. 3. There are certain differences between startup circuit 400 and startup circuit 300 of FIG. 3. As shown in FIG. 4, two series-connected diodes 402 are coupled to a diode 401 and are used to compensate for the temperature characteristics of the startup voltage. Voltage source 308 of FIG. 3 is replaced by serially-connected diodes 410. The startup voltage Vst may be determined from the threshold voltage of NMOS transistor 406, the breakdown voltage of diode 401 and the turn-on voltage of diode 402.

Input supply voltage Vcc is now sampled by voltage VB at a node B between resistors 407 and 411. The turn-off condition is now determined by comparing VB with an internal reference voltage Vref at comparator 405, and the turn-off voltage Voff for Vcc may now be derived from VB and Vref. After SMPS controller 400 enters the normal operation mode, NMOS transistor 406 operates in triode region and its equivalent resistance is relatively small compared with the resistance values for resistors 411 and 407. As a result, the voltage at node B (VB) may be decided by the divided ratio of the resistances for resistors 411 and 407 using the following formula:

$$VB = Vcc*R3/(R2+R3)$$

Figure 5:
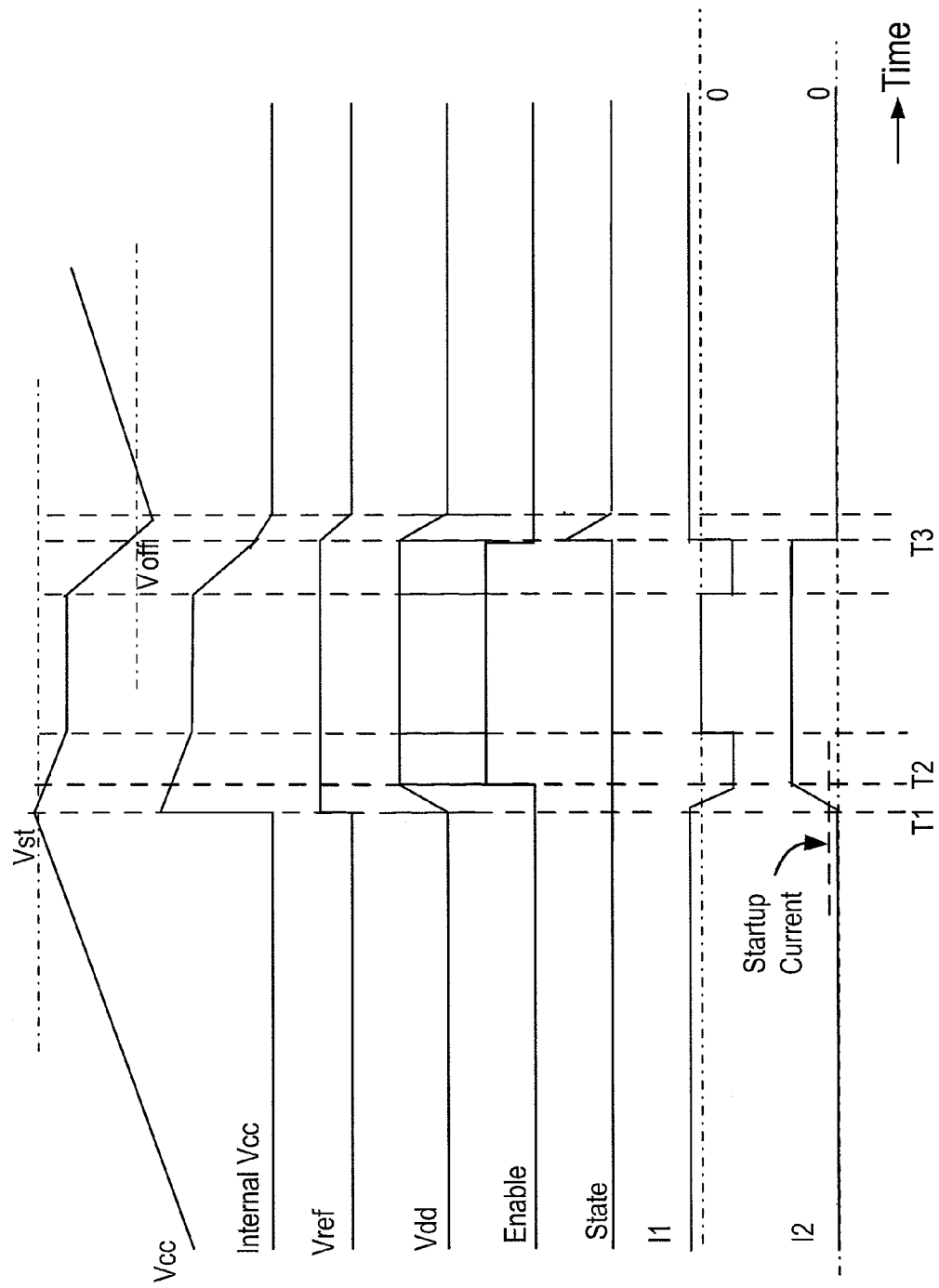
FIG. 5 is a simplified diagram illustrating a variety of waveforms generated by a switching-mode power supply having a sub-microampere startup circuit according to an embodiment of the present invention.

The operation of startup circuit according to embodiments of the present invention is further illustrated in FIG. 5, which shows the waveforms of various signals in startup circuit 300 of FIG. 3 in controller 200 of FIG. 2 during various stages of operation. Waveform Vcc depicts a timing diagram for the input supply voltage provided to the switching-mode power supply controller. Waveform "Internal Vcc" depicts a timing diagram for the internal operating power generated by the startup circuit, shown as "Internal Vcc" in FIG. 3. Waveform Vref depicts a timing diagram for the internal reference voltage generated by the startup circuit, shown as Vref in FIG. 3. Waveform Vdd depicts a timing diagram for an internal voltage generated by a startup circuit, shown as Vdd in FIG. 3. Waveform Enable depicts a timing diagram for an Enable signal generated by a logic circuit in startup circuit 300 of FIG. 3. In FIG. 5, a high value of Enable indicates the normal operation mode and a low value of Enable indicates the startup mode. Waveform State depicts a timing diagram for the State signal in FIG. 3, which sets the controller in the startup mode at a low voltage condition. Waveform I1 depicts a timing diagram for charging current I1 for a capacitor 101 of FIG. 2. Waveform I2 depicts a timing diagram for startup current I2 in FIG. 2.

As also shown in FIG. 5, during the initial startup mode before time T1, Vcc is low and the startup current I2 is determined by the reverse leakage current of diode 301, which can be virtually negligible. Even as Vcc continues to rise, I2 remains low before time T1. When Vcc reaches startup threshold voltage Vst at time T1, it triggers positive feedback circuit 340. The current I2 required for triggering positive feedback circuit 340 is labeled as "Startup Current" in FIG. 5. As described above, in some embodiments of the present invention, the startup current can be less than one microampere. At this point, internal reference voltage Vref and internal power supply Vdd start to be established. At time T2, the Enable signal becomes high, and the SMPS 200 enters into the normal operation mode. During normal operation, current I2 represents the current consumption in the controller, which can now receive operating power from the auxiliary winding of the transformer, and does not place additional demand for charging current Is from line voltage $V_{IN}$.

As shown in FIG. 5, the system remains in normal operation mode between T2 and T3, even though Vcc may be below the startup voltage threshold voltage Vst. During this period, positive feedback circuit 340 can remain operational with a relatively low current requirement, as described above.

At T3, Vcc drops below turn-off voltage (Voff). This may be caused by certain conditions, e.g., system output being shorted to GND in the secondary winding. As a result, the positive feedback loop is broken. Consequently, the internal power supply falls to zero and the Enable signal becomes LOW. The controller switches back to the startup mode after time T3, and I2 is again determined by the reverse leakage current of the diode. As Vcc is charged up again, the cycle described above will be repeated.

As described, a startup circuit is provided to reduce the startup current of a switching-mode power supply, thereby reducing standby power without sacrificing startup time. In one embodiment, a startup circuit is provided that is configured to produce a sub-microampere startup current for a switching-mode power supply controller. In one embodiment, a startup circuit for a switching-mode power supply controller may include a first voltage detector to detect a startup voltage during a startup mode, a positive feedback circuit to generate a positive feedback, thereby locking the power supply controller in a normal operation mode, and a second voltage detector to detect a turn-off voltage that triggers the switching from a normal operation mode to a startup mode. The low startup current according to embodiments of the present allows the use of a large startup resistor (Rst) and reduce the standby current. The low startup current also allows most of the standby current to charge up the startup capacitor and shorten the startup time for the switching-mode power supply. Further, the startup circuit according to embodiments of the present invention not only can be used in startup applications, but also can be used as a clamp circuit.

In some other embodiments, the present invention provides a switching-mode power supply (SMPS). The SMPS is similar to the power supply described above in connection with power supply 100 of FIG. 1, but also has a controller with a startup circuit according to embodiments of the invention. In an embodiment, the controller for controlling the switching mode power supply is similar to the controller described above in the proceeding paragraph. The controller has a startup circuit having a low current consumption. The startup circuit is similar to startup circuit 300 of FIG. 3 or startup 400 of FIG. 4, and, in some embodiments, is configured to consume no more than one microampere of current. The startup circuit has a first voltage detector, a positive feedback circuit, and a second voltage detector. The first voltage detector is configured to trigger the controller from a startup mode to a normal operation mode when a supply voltage exceeds a first threshold voltage. The positive feedback circuit is coupled to the first voltage detector and configured to generate a positive feedback signal, thereby maintaining the switching-mode power supply in the normal operation mode. The second voltage detector is coupled to the first voltage detector and the positive feedback circuit, and configured to trigger the switching-mode power supply to switch from the normal operation mode to the startup mode when the supply voltage is below a second threshold voltage. Various other features of the startup circuit are described above, including the description associated with FIGS. 3 and 4.

While the embodiments and advantages of the present invention have been depicted and described, it will be understood by those skilled in the art that many changes in construction and differing embodiments and applications of the invention will suggest themselves without departing from the spirit and scope of the invention. Thus, the disclosures and descriptions herein are purely illustrative and are not intended to be in any sense limiting.

What is claimed is:

1. A startup circuit for a switching-mode power supply (SMPS), comprising:
   a first voltage detector configured to trigger the switching-mode power supply from a first operation mode to a second operation mode when an input supply voltage exceeds a first threshold voltage, wherein the first threshold voltage is based upon a reverse breakdown voltage of a diode, and a current consumption in the first voltage detector in the first operation mode is determined by a reverse leakage current of the diode;
   a feedback circuit coupled to the first voltage detector and being configured for maintaining a positive feedback loop; and
   a second voltage detector coupled to the first voltage detector and the feedback circuit, and configured to trigger the switching-mode power supply to switch from the second operation mode to the first operation mode when the input supply voltage is below a second threshold voltage.

2. The startup circuit of claim 1 wherein the first voltage detector comprises a resistor coupled to the diode.

3. The startup circuit of claim 1 wherein the first voltage detector comprises a first diode and a resistor coupled in series, and at least one second diode coupled to the first diode for compensating the reverse breakdown voltage temperature characteristic of the first diode.

4. The startup circuit of claim 1 wherein the feedback circuit comprises:
   first and second transistors cross-coupled to each other;

a diode coupled between the first and the second transistors and configured to determine a current direction during establishing a positive feedback loop; and a voltage source coupled to the diode for providing a bias voltage.

5. The startup circuit of claim 4 wherein a first resistor coupled to the gate of the first transistor and a second resistor coupled to the gate of the second transistor are configured to limit a current in the startup circuit to no more than one microampere.

6. The startup circuit of claim 4 wherein the voltage source comprises one or more series-connected diodes.

7. The startup circuit of claim 1 wherein the second voltage detector comprises:
   a PMOS transistor;
   a voltage divider coupled to the PMOS transistor;
   a reference voltage generator coupled to the PMOS transistor and the voltage divider for generating a reference voltage;
   a comparator coupled to the reference voltage generator; and
   an NMOS transistor coupled to the comparator.

8. The startup circuit of claim 7 wherein the comparator has a first input terminal for receiving the reference voltage that is related to the second threshold voltage, and a second input terminal for receiving from the voltage divider a sampled voltage representing the input supply voltage.

9. The startup circuit of claim 7 further comprising a delay circuit coupled to the PMOS transistor, the delay circuit including a resistor and a capacitor.

10. An electronic circuit, comprising:
    an input terminal for receiving a feedback signal;
    an output terminal for outputting an output signal;
    a power supply terminal for receiving a supply voltage;
    a first circuit coupled to the power supply terminal and configured to trigger the electronic circuit from a first operation mode to a second operation mode when the supply voltage exceeds a first threshold voltage;
    a feedback circuit coupled to the first circuit for maintaining a positive feedback loop; and
    a second circuit coupled to the first circuit and the feedback circuit, and configured to trigger the electronic circuit to switch from the second operation mode to the first operation mode when the supply voltage is below a second threshold voltage.

11. The circuit of claim 10 wherein the first circuit, the second circuit, and the feedback circuit are configured to consume no more than one microampere of current.

12. The circuit of claim 10 wherein the first circuit comprises a diode and a resistor coupled to the diode, wherein the first threshold voltage is based upon a reverse breakdown voltage of the diode.

13. The circuit of claim 10 wherein the feedback circuit comprises:
    first and second transistors cross-coupled to each other;
    a diode coupled between the first and the second transistors and configured to determine a current direction during establishing a positive feedback loop; and
    a voltage source coupled to the diode for providing a bias voltage.

14. The circuit of claim 13 wherein the voltage source comprises series-connected diodes.

15. A switching-mode power supply (SMPS) comprising:
    a controller for controlling the switching-mode power supply, wherein a startup circuit for the controller includes:
    a first voltage detector configured to trigger the switching-mode power supply from a first operation mode to a second operation mode when an input supply voltage exceeds a first threshold voltage, a current consumption in the first voltage detector in the first operation mode being determined by a reverse leakage current of a diode;
    a feedback circuit coupled to the first voltage detector for maintaining a positive feedback loop; and
    a second voltage detector coupled to the first voltage detector and the feedback circuit, and configured to trigger the switching-mode power supply to switch from the second operation mode to the first operation mode when the input supply voltage is below a second threshold voltage.

16. The switching-mode power supply of claim 15 further comprising:
    a resistor for coupling to a DC input voltage source for providing a startup current to the controller;
    a capacitor coupled to the resistor for providing a power supply to the controller;
    wherein the resistor has a resistance of 10 MΩ or higher.

17. The switching-mode power supply of claim 15 wherein the first voltage detector comprises a diode and a resistor coupled to the diode, wherein the first threshold voltage is based upon a reverse breakdown voltage of the diode.

18. The switching-mode power supply of claim 15 wherein the feedback circuit comprises:
    at least two transistors and at least two resistors coupled to the at least two transistors, wherein the transistors and the resistors are configured to provide a gain for the positive feedback circuit;
    a diode coupled to one of the transistors and one of the resistors, wherein the diode is configured to determine a current direction during establishing a positive feedback loop; and
    a voltage source coupled to the diode and one of the resistors for providing a voltage.

19. The switching-mode power supply of claim 18 wherein the first voltage detector comprises a diode and a resistor coupled to the diode, wherein the first threshold voltage is based upon a reverse breakdown voltage of the diode.

20. The switching-mode power supply of claim 15 wherein the feedback circuit comprises:
    first and second transistors cross-coupled to each other;
    a diode coupled between the first and the second transistors and configured to determine a current direction during establishing a positive feedback loop; and
    a voltage source coupled to the diode for providing a bias voltage.

21. The switching-mode power supply of claim 20 wherein a first resistor coupled to the gate of the first transistor and a second resistor coupled to the gate of the second transistor are configured to limit a current in the startup circuit to no more than one microampere.

* * * * *